(12) United States Patent
Dahlen et al.

(10) Patent No.: US 9,133,331 B2
(45) Date of Patent: Sep. 15, 2015

(54) SILANE CROSSLINKABLE POLYMER COMPOSITION

(75) Inventors: Kristian Dahlen, Stora Höga (SE); Ola Fagrell, Stenungsund (SE); Kjell Fossum, Stenungsund (SE); Thomas Hjertberg, Kungshamn (SE); Perry Nylander, Göteberg (SE); Oscar Prieto, Göteberg (SE)

(73) Assignee: Borealis AG, Vienna (AT)

( * ) Notice: Subject to any disclaimer, the term of this patent is extended or adjusted under 35 U.S.C. 154(b) by 444 days.

(21) Appl. No.: 13/805,783

(22) PCT Filed: Jun. 10, 2011

(86) PCT No.: PCT/EP2011/059675
§ 371 (c)(1),
(2), (4) Date: Feb. 15, 2013

(87) PCT Pub. No.: WO2011/160964
PCT Pub. Date: Dec. 29, 2011

(65) Prior Publication Data
US 2013/0199820 A1   Aug. 8, 2013

(30) Foreign Application Priority Data

Jun. 21, 2010  (EP) ..................................... 10166636

(51) Int. Cl.
| | |
|---|---|
| H01B 7/00 | (2006.01) |
| C08L 43/04 | (2006.01) |
| B29C 47/00 | (2006.01) |
| B29C 47/02 | (2006.01) |
| B29C 47/06 | (2006.01) |
| C08F 8/00 | (2006.01) |
| C08F 8/12 | (2006.01) |
| C08J 3/22 | (2006.01) |
| C08L 23/08 | (2006.01) |
| H01B 3/44 | (2006.01) |
| H01B 7/02 | (2006.01) |
| H01B 9/00 | (2006.01) |
| C08K 5/56 | (2006.01) |

(52) U.S. Cl.
CPC ............ *C08L 43/04* (2013.01); *B29C 47/0023* (2013.01); *B29C 47/025* (2013.01); *B29C 47/065* (2013.01); *C08F 8/00* (2013.01); *C08F 8/12* (2013.01); *C08J 3/226* (2013.01); *C08L 23/0892* (2013.01); *H01B 3/441* (2013.01); *H01B 7/02* (2013.01); *H01B 9/00* (2013.01); *C08J 2343/04* (2013.01); *C08J 2351/06* (2013.01); *C08J 2423/08* (2013.01); *C08K 5/56* (2013.01)

(58) Field of Classification Search
CPC ............ H01B 3/00; H01B 7/00; H01B 11/00
USPC .. 174/110 R, 120 R, 120 SC, 102 R, 102 SC, 174/106 SC, 121 R
See application file for complete search history.

(56) References Cited

U.S. PATENT DOCUMENTS

| | | | |
|---|---|---|---|
| 4,297,310 A | 10/1981 | Akutsu et al. | |
| 4,351,876 A | 9/1982 | Doi et al. | |
| 4,397,981 A | 8/1983 | Doi et al. | |
| 4,413,066 A | 11/1983 | Isaka et al. | |
| 4,446,283 A | 5/1984 | Doi et al. | |
| 4,456,704 A | 6/1984 | Fukumura et al. | |
| 4,555,539 A | 11/1985 | Bonicel et al. | |
| 4,732,939 A | 3/1988 | Hoshi et al. | |
| 5,985,181 A * | 11/1999 | Yoshida et al. | 252/511 |
| 6,284,374 B1 * | 9/2001 | Yamazaki et al. | 428/383 |
| 7,390,970 B2 * | 6/2008 | Lee et al. | 174/102 SC |
| 2006/0090672 A1 | 5/2006 | Lu et al. | |
| 2010/0300727 A1 * | 12/2010 | Sultan et al. | 174/113 R |
| 2011/0240333 A1 * | 10/2011 | Junqvist et al. | 174/110 SR |
| 2011/0253418 A1 * | 10/2011 | Ek et al. | 174/110 PM |

FOREIGN PATENT DOCUMENTS

| | | |
|---|---|---|
| CA | 50288 A | 10/1895 |
| EP | 1254923 A1 | 11/2002 |
| EP | 1849816 A1 | 10/2007 |
| EP | 1857577 A1 | 11/2007 |
| GB | 1377737 | 12/1974 |
| WO | WO92/21721 | 12/1992 |
| WO | WO2004/072135 | 8/2004 |
| WO | WO2005/003197 A1 | 1/2005 |
| WO | WO2007/032885 A2 | 3/2007 |
| WO | WO2009/059670 A1 | 5/2009 |
| WO | 2010000477 A1 | 1/2010 |
| WO | WO2010/000477 A1 | 1/2010 |

OTHER PUBLICATIONS

International Search Report and Written Opinion for Application No. PCT/EP2011/059675 dated Jul. 21, 2011.
Monte Sal et a., Organo titanate Coupling Agents for Filled Polymers, Proc. Int. Wire Cable Symp., 24th, Jan. 1, 1975, pp. 300-324.

* cited by examiner

*Primary Examiner* — William H Mayo, III
(74) *Attorney, Agent, or Firm* — Meunier Carlin & Curfman LLC

(57) ABSTRACT

A crosslinkable polymer composition having (a) a polyolefin bearing hydrolysable silane groups and a silanol condensation catalyst compound, as well as to an article, preferably a cable, thereof. A silanol condensation catalyst compound utilized for crosslinking an article, preferably a layer of a cable.

17 Claims, No Drawings

SILANE CROSSLINKABLE POLYMER COMPOSITION

REFERENCE TO RELATED APPLICATIONS

This application claims the domestic priority benefit of PCT Patent Application No. PCT/EP11/59675, filed on Jun. 10, 2011, and European Patent Application No. 10166636.0, filed on Jun. 21, 2010, the entire contents of which are incorporated herein by reference.

The present invention relates to a polymer composition comprising a crosslinkable polyolefin with hydrolysable silane groups and a silanol condensation catalyst, to a use of the polymer composition for producing an article, preferably a cable, to the preparation method of an article, preferably a cable, comprising said composition, the method including the crosslinking step of the article, preferably a layer of the cable, to an article, preferably a cable, comprising said composition and to a crosslinked article, preferably to a crosslinked cable, comprising said composition.

It is known to crosslink polyolefins by means of additives as this improves several of the properties of the polyolefin, such as mechanical strength and chemical heat resistance. Crosslinking may be performed by condensation of silanol groups contained in the polyolefin which can be obtained by hydrolysation of silane groups. A silane compound may be introduced as a crosslinkable group into a polyolefin e.g. by grafting the silane compound onto the polyolefin, or by copolymerisation of olefin monomers and silane group containing monomers. Such techniques are known e.g. from U.S. Pat. No. 4,413,066, U.S. Pat. No. 4,297,310, U.S. Pat. No. 4,351,876, U.S. Pat. No. 4,397,981, U.S. Pat. No. 4,446,283 and U.S. Pat. No. 4,456,704.

As well known the polymer composition are useful for producing wide variety of articles. For instance polymers are typically used for preparing layers in wire or cable (W&C) applications, whereby one or more of the layers can be crosslinked. Power cable is defined to be a cable transferring energy operating at any voltage level, typically operating at voltage higher than 100 V. The voltage applied to the power cable can be alternating (AC), direct (DC) or transient (impulse). Moreover, the polymer composition is typically used as a layer material e.g. in a low voltage (LV), a medium voltage (MV), a high voltage (HV) or an extra high voltage (EHV) AC or DC cable, which terms, as well known, and indicate the level of operating voltage.

Power cables for low voltages (LV) operate typically at voltages of below 3 kV. LV cable and in some embodiment medium voltage (MV) cables usually comprise an electric conductor which is coated with an insulation layer.

Medium voltage (MV) and high voltage (HV) power cables, and in some embodiments also LV power cables comprise a conductor surrounded at least by an inner semiconductive layer, an insulation layer and an outer semiconductive layer, in that order. MV and HV cables operate any voltage levels used for other applications than for low voltages. A typical MV cable, usually operates at voltages from 3 to 36 kV, and a typical HV cable at voltages higher than 36 kV.

For crosslinking of polyolefins containing hydrolysable silane groups, a silanol condensation catalyst must be used. Conventional catalysts are, for example, tin-, zinc-, iron-, lead- or cobalt-organic compounds such as dibutyl tin dilaurate (DBTDL). However, it is known that DBTDL has a negative impact on the natural environment when the crosslinked products, such as cables, are installed in the ground. Furthermore, is also a hazardous material to work with.

CA50288 describes Ti catalysts for curing epoxy functionalised polymers. GB1377737 describes grafting a polyolefin by UV radiation with silane compound. The grafted polyolefin is subsequently crosslinked with a metal carboxylate, titanium ester or titanium chelate. The catalyst used in the examples is dibutyltin laurate. No use in wire and cable (W&C) applications are mentioned. WO2007032885 describes tin catalysts for W&C crosslinking applications.

It is hence an object of the present invention to provide a further silanol condensation catalyst for a polymer composition comprising a polyolefin bearing hydrolysable silane groups, which avoids the drawbacks of DBTDL, i.e. which is more environmentally friendly and less hazardous to work with.

DESCRIPTION OF THE INVENTION

It has now surprisingly been found that the above objects can be achieved with a new type of silanol condensation catalyst which is highly advantageous for silane crosslinking a polymer composition and articles thereof, preferably a layer of a cable.

Accordingly, the present invention provides a polymer composition
which comprises
(a) a polyolefin bearing hydrolysable silane groups and
(b) a silanol condensation catalyst compound of formula (I) or (II):

$$MeR^1_n R^2_m Z_o \qquad (I),$$

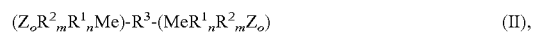

$$(Z_o R^2_m R^1_n Me)\text{-}R^3\text{-}(MeR^1_n R^2_m Z_o) \qquad (II),$$

wherein in formula (I)
Me is a transition metal of group 4 of Periodic Table of the Elements (according to IUPAC nomenclature of inorganic industry 1989);
n is an integer between 0 to 3;
m is an integer between 0 to 4,
o is an integer between 0 to 4, wherein n+m+o is 4, and at least m or o is other than 0;
each $R^1$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s); and
each $R^2$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s); or is a group hydrolysable to a Brönsted acid; provided that if o is 0, then at least one $R^2$ is a group hydrolysable to a Brönsted acid;
or $R^1$ and $R^2$, or two $R^1$ groups or two $R^2$ groups form together with Me a ring system;
each Z is independently a halogen atom;
or wherein in formula (II),
Me and $R^1$ have the meaning as defined in formula (I) above, and $R^2$ has the meaning as defined in formula (I) above, but without the above proviso;
n is an integer between 0 to 3
m is an integer between 0 to 3
o is an integer between 0 to 3, wherein n+m+o is 3; and
$R^3$ independently has the meaning as defined for $R^1$ in formula (I) above or $R^2$ in formula (I) above, but without the above proviso.

The silanol condensation catalyst compound of formula (I) or (II) (b) is more environmental friendly catalyst compared e.g. to tin based catalysts. The compound of formula (I) or (II) has also unexpectedly good crosslinking efficiency, expressed e.g. as hot set properties or gel content as defined below under Determination methods. The silanol condensation catalyst compound of formula (I) or (II) (b) can surprisingly be used as crosslinking catalyst in industrially suitable amounts for producing crosslinked cable layers with demanding mechanical properties required for a power cable. The crosslinked polymer composition of the invention has also good electrical properties needed in W&C field.

The polymer composition of the invention as defined above or below is referred herein also shortly as "polymer composition". As to the components of the polymer composition, the polyolefin bearing hydrolysable silane groups (a) is referred herein also shortly as "polyolefin (a)" and the silanol condensation catalyst compound of formula (I) or (II) (b) is referred herein also shortly as "compound of formula (I) or (II)".

Moreover, the term "polymer composition" means herein the combination of polyolefin (a) and the compound of formula (I) or (II) which is made before or after forming a shaped article, such as a cable layer.

The invention further provides a use of compound of formula (I) or (II) as defined above or below for crosslinking a polyolefin (a) as defined above or below, more preferably for crosslinking an article, preferably at least one layer of a cable, comprising said polyolefin (a).

Also an article, preferably a cable, comprising said polyolefin (a), and the production process thereof, is provided. Preferably the article is crosslinked.

The following preferable embodiments, properties and subgroups of the polyolefin (a) and the compound of formula (I) or (II) components, of the polymer composition and of the article are independently generalisable so that they can be used in any order or combination to further define the preferable embodiments of the polymer composition and the article, preferably cable, of the invention. Moreover, unless otherwise stated, it is evident that the given polyolefin (a) descriptions apply to the polyolefin prior optional crosslinking.

Silanol Condensation Catalyst Compound of Formula (I) or (II) (b) (=Compound of Formula (I) or (II))

Naturally, the polymer composition may comprise two or more compounds of formula (I) or (II), or any mixtures of compounds of formula (I) and (II), preferably one compound of formula (I) or (II).

A hydrocarbyl group can be linear, branched or cyclic or a mixture of cyclic and linear or branched groups. For the avoidance of doubt, the term "hydrocarbyl" used herein does not mean aromatic cyclic groups as is clear from the definitions used herein, i.e. aromatic cyclic groups are defined as aromatic hydrocarbyl. The expression "partially unsaturated" means that the moiety may comprise one or more double or triple bonds and includes alkenyl radicals comprising at least one double bond and alkynyl radicals comprising at least one triple bond. In case of "partially unsaturated cyclic hydrocarbyl" there can be one or more double bonds in the ring systems meaning that the ring is non-aromatic to differentiate said "partially unsaturated" ring moieties from "aromatic rings" such as phenyl or pyridyl radicals.

The expression "monocyclic" includes monocyclic ring systems, such as cyclopentyl, cyclohexyl, cycloheptyl or phenyl. The expression "multicyclic" means herein fused ring systems, such as naphthyl.

The term "optional" in compound (I) or (II) means "may or may not be present", e.g. "optionally substituted" covers the possibilities that a substituent is present or is not present. The term "unsubstituted" naturally means that no substituent is present.

Each of the below preferable subgroups of the substituents are generalisable and can be combined in any combination in the compounds of formula (I) or (II):

In compounds of formula (I) and compounds of formula (II): Me is preferably Ti, Zr or Hf, more preferably Ti or Zr.

In compounds of formula (I): n is preferably 1 to 3, more preferably 1 or 2. m is preferably 1 to 3, more preferably 2 or 3. o is preferably 0 or 1, more preferably 0.

In compounds of formula (II): n is preferably 1 to 3, more preferably 1 or 2, more preferably 0. m is preferably 1 to 3, more preferably 2 or 3. o is preferably 0 or 1. Further preferably in compounds (II) at least m or o is other than 0.

In preferable compounds of formula (I) or in preferable compounds of formula (II): Heteroatom is preferably selected from O, S, P, N, Si, B or halogen (F, Cl, Br or I), more preferably from O, S, P, N or Si. The position of the heteroatom in the hydrocarbyl group is not limited. Heteroatom(s) can thus be in any of the positions: at the beginning of, at end of or within (i.e. interrupting C—C links) the hydrocarbyl group.

Preferably, each $R^1$ is independently —$X_w$—R1, wherein w is 0 or 1; X is a heteroatom as defined above, preferably O, S, P, N, Si, more preferably O, more preferably, each $R^1$ is independently $X_w$—$R^1$, wherein w is 0 or w is 1 and X is O; and $R^1$ is substituted or unsubstituted saturated or partially unsaturated hydrocarbyl group which optionally contains one or more heteroatom(s), or a substituted or unsubstituted aromatic hydrocarbyl group which optionally contains one or more heteroatom(s).

Preferably, at least 1, preferably 2 or 3 of $R^2$ is independently a group hydrolysable to Brönsted acid, more preferably —Y—R2; Y is preferably —OC(=O)—, —C(=O)—O—C(=O)—, —$NR^4$C(=O)—, —OC(=O)$NR^4$—, —OC(=O)O—, —$NR^4$C(=O)OR—, —C(=O)NC(=O)—, —OS(=O)$_2$—, —OP(=O)$_2$—, —$NR^4$S(=O)$_2$, —OS(=O)$_2$$NR^4$, —SC(=O)—, —OP$R^5$(=O)O, —OP(=O)(O$R^5$)O—, or —OP$R^5$(=O)OP(=O)(OR2)O—, wherein each $R^4$ independently is H or a linear hydrocarbyl group, preferably (C1-C8)alkyl group, more preferably $R^4$ is H; and each $R^5$ independently is H or R2 as defined below; and each R2 independently is substituted or unsubstituted saturated or partially unsaturated hydrocarbyl group which optionally contains one or more heteroatom(s); or a substituted or unsubstituted aromatic hydrocarbyl group which optionally contains one or more heteroatom(s).

More preferably, each $R^2$ is independently —OC(=O)—$R^2$, —OS(=O)$_2$—$R^2$, —OP(=O)$_2$—$R^2$, —OP$R^5$(=O)OP(=O)(O—R2)$_2$, wherein $R^5$ is as defined above or below, preferably $R^5$ is H; or —OP(=O)(O$R^5$)O—R2, wherein $R^5$ is as defined above, preferably $R^5$ is $R^2$ as defined above or below. More preferably, $R^2$ is —OC(=O)—R2 or —OS(=O)$_2$—R2.

In preferable compounds of formula (II): $R^3$ is preferably a group hydrolysable to Brönsted acid, more preferably $R^3$ has the meaning as defined for Y above, more preferably —OP(=O)(O$R^5$)O—, wherein $R^5$ is as defined above, more preferably $R^2$ as defined above or below, more preferably a substituted or unsubstituted saturated or partially unsaturated hydrocarbyl group as defined below or in claims.

Substituted or unsubstituted saturated or partially unsaturated hydrocarbyl group which optionally contains one or more heteroatom(s) as R1 or R2 moieties of substituents $R^1$ or $R^2$ substituents of Compounds (I) or Compounds (II) is more preferably (i) an optionally substituted linear or branched, saturated or partially unsaturated hydrocarbyl group;
(ii) an optionally substituted linear or branched, saturated or partially unsaturated hydrocarbyl group which bears a saturated or partially unsaturated cyclic hydrocarbyl moiety or an optionally substituted linear or branched, saturated or partially unsaturated hydrocarbyl group which bears an aromatic hydrocarbyl moiety; preferably an optionally substituted linear or branched, saturated or partially unsaturated hydrocarbyl group which bears a saturated or partially unsaturated cyclic hydrocarbyl moiety; or
(iii) an optionally substituted saturated or partially unsaturated cyclic hydrocarbyl group.

Each of the above options (i), (ii) and (iii) as substituted or unsubstituted saturated or partially unsaturated hydrocarbyl group may independently contain one or more hetero atoms, preferably one or two, which is/are preferably independently O or N, preferably O atom.

Substituted or unsubstituted aromatic hydrocarbyl group which optionally contains one or more heteroatom(s) as R1 or R2 moieties of Compounds (I) or Compounds (II) is a mono or polycyclic aryl which has 6 to 12 carbon atoms and which may contain one or more heteroatoms as defined above, more preferably a mono or polycyclic aryl with carbon ring atoms, more preferably a phenyl moiety. The aromatic hydrocarbyl group may bear one or more substituents and if present, then preferably (i) an optionally substituted linear or branched, saturated or partially unsaturated hydrocarbyl group as defined above.

More preferably R1 and R2 moieties of Compounds (I) or Compounds (II) are each independently selected
from an optionally substituted linear or branched hydrocarbyl group; which is preferably an optionally substituted linear or branched (C1-C50)alkyl group, an optionally substituted linear or branched (C2-C50)alkenyl group or an optionally substituted linear or branched (C2-C30)alkynyl group; more preferably a linear or branched (C1-C50)alkyl group, preferably a linear or branched (C1-C30)alkyl group, more preferably a linear or branched (C1-C20)alkyl group;
from an optionally substituted mono or polycyclic aryl group which has 6 to 12 carbon atoms and which may contain one or more heteroatoms as defined above, which is preferably an optionally substituted mono or polycyclic aryl group with carbon ring atoms, more preferably an optionally substituted phenyl group; or
from a linear or branched (C1-C20)alkyl(O—(C1-C20)alkyl)$_p$, (C1-C20)alkyl(O—(C1-C20)alkenyl)$_p$ or (C1-C20)alkyl-O(C1-C20)alkyl)$_e$(C1-C20)alkenyl)$_f$, wherein each p is independently 1, 2 or 3, e is 0, 1 or 2 and f is 0, 1 or 2; preferably a linear or branched (C1-C12)alkyl(O—(C1-C12)alkyl)$_p$ or (C1-C12)alkyl(O—(C1-C12)alkenyl)$_p$, wherein each p is independently 1 or 2. The aromatic hydrocarbyl group is optionally, and preferably, substituted with 1 to 4, preferably 1 or 2, more preferably 1, substituent(s), which are each independently selected from an optionally substituted linear or branched, saturated or partially unsaturated hydrocarbyl group as defined above, preferably from a linear or branched (C1-C50) alkyl group, more preferably from a linear or branched (C1-C30) alkyl group, even more preferably a linear or branched (C1-C20)alkyl group.

Two or more R$^1$ groups can be identical or different. In case of two or more R$^1$ groups, these are preferably identical.

Two or more R$^2$ groups can be identical or different. In case of two or more R$^2$ groups, these are preferably identical.

In case of compounds of formula (I) wherein at least one R$^2$ group(s) is a group hydrolysable to a Brönsted acid and one or more R$^2$ group(s) is other than a group hydrolysable to a Brönsted acid, then the other one or more such R$^2$ group can be independently identical to or different from any one or more R$^1$ group(s).

Preferred compounds of the invention are compounds of formula (I) as defined above, below or in claims.

Even more preferred compounds of formula (I) are those wherein Me, n, m and o are as defined above; each R$^1$ independently is as defined above, preferably —X$_w$—R$^1$, wherein w is 0 or 1; X is a heteroatom as defined above, X is preferably O, S, P, N or Si, more preferably O, more preferably R$^1$ is X$_w$—R$^1$, wherein w is 0 or w is 1 and X is O; R$^1$ moiety is selected
from a substituted or unsubstituted saturated or partially unsaturated hydrocarbyl group which optionally contains one or more heteroatom(s), as defined above, more preferably an optionally substituted linear or branched, saturated or partially unsaturated hydrocarbyl group as defined above, preferably a linear or branched (C1-C50)alkyl group, preferably a linear or branched (C1-C30)alkyl group, more preferably a linear or branched (C1-C20)alkyl group; or
from a linear or branched (C1-C20)alkyl(O—(C1-C20)alkyl)$_p$, (C1-C20)alkyl(O—(C1-C20)alkenyl)$_p$ or (C1-C20)alkyl-O(C1-C20)alkyl)$_e$(C1-C20)alkenyl)$_f$, wherein each p is independently 1, 2 or 3, e is 0, 1 or 2 and f is 0, 1 or 2; preferably a linear or branched (C1-C12)alkyl(O—(C1-C12)alkyl)$_p$ or (C1-C12)alkyl(O—(C1-C12)alkenyl)$_p$, wherein each p is independently 1 or 2;
each R$^2$ independently is preferably a group selected from a group hydrolysable to a Brönsted acid, more preferably each R$^2$ independently is Y—R2 as defined above, wherein Y is preferably —OC(=O)—, —C(=O)—O—C(=O)—, —NR$^4$C(=O)—, —OC(=O)NR$^4$—, —OC(=O)O—, —NR$^4$C(=O)OR—, —C(=O)NC(=O)—, —OP(=O)$_2$—, —NR$^4$S(=O)$_2$, OS(=O)$_2$NR$^4$—, —SC(=O)—, —OPR$^5$(=O)O, —OP(=O)(OR$^5$)O—, —OPR$^5$(=O)OP(=O)(OR$^2$)O—, or —OS(=O)$_2$—, wherein each R$^4$ is independently H or a linear hydrocarbyl group, which is preferably (C1-C8)alkyl group, or, more preferably R$^4$ is H; each R$^5$ is independently H or has the meaning as defined for R2 moiety above or below; and each R2 moiety independently is a substituted or unsubstituted saturated or partially unsaturated hydrocarbyl group which optionally contains one or more heteroatom(s), or a substituted or unsubstituted aromatic hydrocarbyl group which optionally contains one or more heteroatom(s) as defined above.

In one preferable subgroup of compounds of formula (I), R$^2$ is independently selected from —OC(=O)—R2, —OP(=O)$_2$—R2, —OPR$^5$(=O)OP(=O)(O—R2)$_2$ (wherein R$^5$ is as defined above, preferably H), —OP(=O)(OR$^5$)O—R2 (wherein R$^5$ is as defined above, preferably R$^2$ as defined above or below) or —OS(=O)$_2$—R2; and R2 is as defined above or below. In this preferable subgroup of compounds of formula (I) each R$^2$ is independently selected from
(a) —OC(=O)—R2, —OP(=O)$_2$—R2, —OPR$^5$(=O)OP(=O)(O—R2)$_2$ (wherein R$^5$ is as defined above, preferably H), or —OP(=O)(OR$^5$)O—R2 (wherein R$^5$ is preferably R2); and R2 moiety is independently selected
from a substituted or unsubstituted saturated or partially unsaturated hydrocarbyl group which optionally contains one or more heteroatom(s) as defined above, preferably an optionally substituted linear or branched hydrocarbyl group; preferably an optionally substituted linear or branched (C1-C50) alkyl group, an optionally substituted linear or branched (C2-C50)alkenyl group or an optionally substituted linear or branched (C2-C30)alkynyl group; more preferably a linear or branched (C1-C50)alkyl group, preferably a linear or branched (C1-C30)alkyl group, more preferably from linear or branched (C1-C20)alkyl group; or from an optionally substituted mono or polycyclic aryl group which has 6 to 12 carbon atoms and which may contain one or more heteroatoms as defined above, more preferably an optionally substituted mono or polycyclic aryl group with carbon ring atoms, more preferably an optionally substituted phenyl group or a naphthyl group, more preferably a phenyl group, and wherein the aromatic hydrocarbyl group is preferably substituted with 1 to 4, preferably 1 or 2, more preferably 1, substituent(s), which are each independently selected from linear or branched, saturated or partially unsaturated hydrocarbyl group as defined above, preferably from linear or branched (C1-C50)alkyl groups, preferably from linear or branched (C1-C30)alkyl groups, more preferably from linear or branched (C1-C20)alkyl groups;

or (b) $R^2$ is —OS(=O)$_2$—R2; and R2 moiety is selected from a substituted or unsubstituted saturated or partially unsaturated hydrocarbyl group which optionally contains one or more heteroatom(s) as defined above, preferably a linear or branched hydrocarbyl group; preferably an optionally substituted linear or branched (C1-C50)alkyl group, an optionally substituted linear or branched (C2-C50)alkenyl group or an optionally substituted linear or branched (C2-C30)alkynyl group; more preferably a linear or branched (C1-C50)alkyl group, preferably a linear or branched (C1-C30)alkyl group, more preferably from linear or branched (C1-C20)alkyl group; or from an optionally substituted mono or polycyclic aryl group which has 6 to 12 carbon atoms and which may contain one or more heteroatoms as defined above, more preferably an optionally substituted mono or polycyclic aryl group with carbon ring atoms, more preferably an optionally substituted phenyl group or a naphthyl group, more preferably a phenyl group, and wherein the aromatic hydrocarbyl group is preferably substituted with 1 to 4, preferably 1 or 2, more preferably 1, substituent(s), which are each independently selected from linear or branched, saturated or partially unsaturated hydrocarbyl group as defined above, preferably from linear or branched (C1-C50)alkyl groups, preferably from linear or branched (C1-C30)alkyl groups, more preferably from linear or branched (C1-C20)alkyl groups.

The most preferred silanol condensation catalyst (b) of the invention is a subgroup (Ia) of the compounds (I) of the invention, wherein Me is Ti, Zr or Hf, more preferably Ti or Zr;
n is 1 or 2; m is 2 or 3; o is 0;
each $R^1$ is independently as defined above, preferably —Xw-R1, wherein w is 0 or 1; X is a heteroatom as defined above, X is preferably O, S, P, N or Si, more preferably O, and more preferably, $R^1$ is Xw-R1, wherein w is 0 or w is 1 and X is O;
R1 moiety is selected from an optionally substituted linear or branched, saturated or partially unsaturated hydrocarbyl group as defined above, preferably a linear or branched (C1-C50)alkyl group, preferably a linear or branched (C1-C30) alkyl group, more preferably a linear or branched (C1-C20) alkyl group, and more preferably a linear or branched (C1-C12)alkyl group; or from a linear or branched (C1-C20)alkyl (O—(C1-C20)alkyl)$_p$, (C1-C20)alkyl(O—(C1-C20) alkenyl)$_p$ or (C1-C20)alkyl-O(C1-C20)alkyl)$_e$(C1-C20) alkenyl)$_f$, wherein each p is independently 1, 2 or 3, e is 0, 1 or 2 and f is 0, 1 or 2; preferably a linear or branched (C1-C12)alkyl(O—(C1-C12)alkyl)$_p$ or (C1-C12)alkyl(O—(C1-C12)alkenyl)p, wherein each p is independently 1 or 2; and each $R^2$ is independently selected from
a) —OC(=O)—R2, —OP(=O)$_2$—R2, —OPR$^5$(=O)OP (=O)(O—R2)$_2$ (wherein $R^5$ is as defined above, preferably H), or —OP(=O)(OR$^5$)O—R2 (wherein $R^5$ is preferably R2 moiety as defined below), more preferably —OC(=O)—R2 or —OPR$^5$(=O)OP(=O)(O—R2)$_2$ (wherein $R^5$ is H); and
each R2 moiety is independently selected
from a substituted or unsubstituted saturated or partially unsaturated hydrocarbyl group which optionally contains one or more heteroatom(s) as defined above, preferably an optionally substituted linear or branched hydrocarbyl group; preferably an optionally substituted linear or branched (C1-C50) alkyl group, an optionally substituted linear or branched (C2-C50)alkenyl group or an optionally substituted linear or branched (C2-C30)alkynyl group; more preferably a linear or branched (C1-C50)alkyl group, preferably a linear or branched (C1-C30)alkyl group, more preferably from linear or branched (C1-C20)alkyl group, and more preferably from linear or branched (C1-C12)alkyl group; or from an optionally substituted mono or polycyclic aryl group which has 6 to 12 carbon atoms and which may contain one or more heteroatoms as defined above, more preferably an optionally substituted mono or polycyclic aryl group with carbon ring atoms, more preferably an optionally substituted phenyl group or a naphthyl group, more preferably a phenyl group, and wherein the aromatic hydrocarbyl group is preferably substituted with 1 to 4, preferably 1 or 2, more preferably 1, substituent(s), which are each independently selected from linear or branched, saturated or partially unsaturated hydrocarbyl group as defined above, preferably from linear or branched (C1-C50)alkyl groups, preferably from linear or branched (C1-C30)alkyl groups, more preferably from linear or branched (C1-C20)alkyl groups, and more preferably from linear or branched (C1-C12)alkyl group; even more preferably each $R^2$ moiety is independently linear or branched (C1-C20)alkyl group, and more preferably from linear or branched (C1-C12)alkyl group;

or (b) $R^2$ is —OS(=O)$_2$—R2; and R2 moiety is selected from an optionally substituted linear or branched (C2-C50)alkenyl group or an optionally substituted linear or branched (C2-C30)alkynyl group; more preferably a linear or branched (C1-C50)alkyl group, preferably a linear or branched (C1-C30)alkyl group, more preferably from linear or branched (C1-C20)alkyl group, and more preferably linear or branched (C1-C12)alkyl group; or from an optionally substituted mono or polycyclic aryl group which has 6 to 12 carbon atoms and which may contain one or more heteroatoms as defined above, more preferably an optionally substituted mono or polycyclic aryl group with carbon ring atoms, more preferably an optionally substituted phenyl group or a naphthyl group, more preferably a phenyl group, and wherein the aromatic hydrocarbyl group is preferably substituted with 1 to 4, preferably 1 or 2, more preferably 1, substituent(s), which are each independently selected from linear or branched, saturated or partially unsaturated hydrocarbyl group as defined above, preferably from linear or branched (C1-C50)alkyl groups, preferably from linear or branched (C1-C30)alkyl groups, more preferably from linear or branched (C1-C20)alkyl groups, and more preferably from linear or branched (C1-C12)alkyl group.

Suitable compounds (I) and (II) (b) are as such well known and can be e.g. commercially available or can be prepared according to or analogously to known preparation methods described in the chemical literature.

Polyolefin Bearing Hydrolysable Silane Groups (a) (=Polyolefin (a))

Where herein it is referred to a "polymer", e.g. polyolefin, such as polyethylene, this is intended to mean both a homo- or copolymer, e.g. a homopolymer and copolymer of an olefin, such as a homopolymer and copolymer ethylene.

The hydrolysable silane groups may be introduced into the polyolefin of polyolefin (a) by copolymerisation of olefin, e.g. ethylene, monomers with at least silane group(s) containing comonomers or by grafting a silane group(s) containing compound to the polyolefin. Grafting is preferably effected by radical reaction, e.g. in the presence of a radical forming agent (such as peroxide). Both techniques are well known in the art.

Preferably, the polyolefin bearing hydrolysable silane groups (a) is a copolymer of olefin with a silane group(s) bearing comonomer and, optionally, with other comonomer(s); or is a homopolymer or copolymer of olefin with silane groups which are introduced by grafting a silane group(s) containing compound to the polyolefin polymer.

As well known "comonomer" refers to copolymerisable comonomer units.

The silane group(s) containing comonomer for copolymerising silane groups or the silane group(s) containing compound for grafting silane groups to produce polyolefin (a) is preferably an unsaturated silane compound represented by the formula

$$R^1SiR^2_qY_{3-q} \quad (Ic)$$

wherein
$R^1$ is an ethylenically unsaturated hydrocarbyl, hydrocarbyloxy or (meth)acryloxy hydrocarbyl group,
$R^2$ is an aliphatic saturated hydrocarbyl group,
Y which may be the same or different, is a hydrolysable organic group and
q is 0, 1 or 2.

Special examples of the unsaturated silane compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred unsaturated silane compound is represented by the formula

$$CH_2=CHSi(OA)_3 \quad (IIc)$$

wherein A is a hydrocarbyl group having 1-8 carbon atoms, preferably 1-4 carbon atoms; or suitable silane compounds are e.g. gamma-(meth)acryloxypropyl trimethoxysilane, gamma(meth)acryloxypropyl triethoxysilane, and vinyl triacetoxysilane, or combinations of two or more thereof.

Most preferred compounds are vinyl trimethoxysilane, vinyl bismethoxyethoxysilane, vinyl triethoxysilane.

Suitable silane group(s) containing comonomer for copolymerising silane groups or the silane group(s) containing compound for grafting silane groups to produce polyolefin (a) are as such well known and can be e.g. commercially available or can be prepared according to or analogously to known preparation methods described in the chemical literature.

A suitable polyolefin for the polyolefin bearing hydrolysable silane groups (a) can be any polyolefin, such as any conventional polyolefin, which can be used for producing an article, preferably a cable layer of a cable, of the present invention. For instance such suitable conventional polyolefins are as such well known and can be e.g. commercially available or can be prepared according to or analogously to known polymerization processes described in the chemical literature.

The polyolefin (a) for the polymer composition is preferably selected from a polypropylene (PP) or polyethylene (PE), preferably from a polyethylene, bearing hydrolysable silane groups.

In case a polyolefin (a) is a copolymer of ethylene with at least one comonomer other than silane group(s) containing comonomer (referred herein also shortly as "other comonomer") and wherein the silane group(s) are incorporated by grafting or copolymerizing with a silane group(s) containing comonomer, then suitable such other comonomer is selected from non-polar comonomer(s) or polar comonomers, or any mixtures thereof. Preferable other non-polar comonomers and polar comonomers are described below in relation to polyethylene produced in a high pressure process.

Preferable polyolefin (a) is a polyethylene produced in the presence of an olefin polymerisation catalyst or a polyethylene produced in a high pressure process, which bears hydrolysable silane groups.

"Olefin polymerisation catalyst" means herein preferably a conventional coordination catalyst. It is preferably selected from a Ziegler-Natta catalyst, single site catalyst which term comprises a metallocene and a non-metallocene catalyst, or a chromium catalyst, or any mixture thereof. The terms have a well known meaning.

Polyethylene polymerised in the presence of an olefin polymerisation catalyst is also often called as "low pressure polyethylene" to distinguish it clearly from polyethylene produced in a high pressure process. Both expressions are well known in the polyolefin field. Low pressure polyethylene can be produced in polymerisation process operating i.a. in bulk, slurry, solution, or gas phase conditions or in any combinations thereof. The olefin polymerisation catalyst is typically a coordination catalyst.

More preferably, the polyolefin (a) is selected from a homopolymer or a copolymer of ethylene produced in the presence of a coordination catalyst or produced in a high pressure polymerisation process, which bears hydrolysable silane groups.

In a first embodiment of the polyolefin (a) of the polymer composition of the invention, the polyolefin (a) is a low pressure polyethylene (PE) bearing the hydrolysable silane groups. Such low pressure PE is preferably selected from a very low density ethylene copolymer (VLDPE), a linear low density ethylene copolymer (LLDPE), a medium density ethylene copolymer (MDPE) or a high density ethylene homopolymer or copolymer (HDPE). These well known types are named according to their density area. The term VLDPE includes herein polyethylenes which are also known as plastomers and elastomers and covers the density range of from 850 to 909 kg/m³. The LLDPE has a density of from 909 to 930 kg/m³, preferably of from 910 to 929 kg/m³, more preferably of from 915 to 929 kg/m³. The MDPE has a density of from 930 to 945 kg/m³, preferably 931 to 945 kg/m³ The HDPE has a density of more than 945 kg/m³, preferably of more than 946 kg/m³, preferably form 946 to 977 kg/m³, more preferably form 946 to 965 kg/m³. More preferably such low pressure copolymer of ethylene for the polyolefin (a) is copolymerized with at least one comonomer selected from C3-20 alpha olefin, more preferably from C4-12 alpha-olefin, more preferably from C4-8 alpha-olefin, e.g. with 1-butene, 1-hexene or 1-octene, or a mixture thereof. The amount of comonomer(s) present in a PE copolymer is from 0.1 to 15 mol %, typically 0.25 to 10 mol-%.

Moreover, in case the polyolefin (a) is a low pressure PE polymer bearing the hydrolysable silane groups, then such PE can be unimodal or multimodal with respect to molecular weight distribution (MWD=Mw/Mn). Generally, a polymer comprising at least two polymer fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions.

"Polymer conditions" mean herein any of process parameters, feeds and catalyst system.

Unimodal low pressure PE can be produced by a single stage polymerisation in a single reactor in a well known and documented manner. The multimodal PE can be produced in one polymerisation reactor by altering the polymerisation conditions and optionally the catalyst, or, and preferably, in the multistage polymerisation process which is conducted in at least two cascaded polymerisation zones. Polymerisation zones may be connected in parallel, or preferably the polymerisation zones operate in cascaded mode. In the preferred multistage process a first polymerisation step is carried out in at least one slurry, e.g. loop, reactor and the second polymerisation step in one or more gas phase reactors. One preferable multistage process is described in EP517868.

A LLDPE or MDPE as defined above or below are preferable type of low pressure PE for polyolefin (a), more preferably a LLDPE copolymer as defined above or below. Such LLDPE can unimodal or multimodal.

The silane group(s) can be incorporated to the low pressure polyethylene by grafting or by copolymerizing ethylene with a silane group(s) containing comonomer and optionally with other comonomer(s), which is preferably a non-polar comonomer. Preferable hydrolysable silane groups bearing low pressure PE is a homopolymer of ethylene, MDPE copolymer or a LLDPE copolymer, more preferably LLDPE copolymer, wherein the silane group(s) are incorporated by grafting a silane group containing compound.

The low pressure PE as the polyolefin bearing hydrolysable silane groups (a) has preferably an $MFR_2$ of up to 1200 g/10 min, such as of up to 1000 g/10 min, preferably of up to 500 g/10 min, preferably of up to 400 g/10 min, preferably of up to 300 g/10 min, preferably of up to 200 g/10 min, preferably of up to 150 g/10 min, preferably from 0.01 to 100, preferably from 0.01 to 50 g/10 min, preferably from 0.01 to 40.0 g/10 min, preferably of from 0.05 to 30.0 g/10 min, preferably of from 0.1 to 20.0 g/10 min, more preferably of from 0.2 to 15.0 g/10 min.

In a second embodiment of the polyolefin (a) of the invention, the polyolefin (a) is a polyethylene which is produced in a high pressure polymerisation (HP) and bears hydrolysable silane groups. In this embodiment the polyethylene is preferably produced in a high pressure polymerisation process in the presence of an initiator(s), more preferably is a low density polyethylene (LDPE), bearing hydrolysable silane groups. It is to be noted that a polyethylene produced in a high pressure (HP) process is referred herein generally as LDPE and which term has a well known meaning in the polymer field. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as different branching architecture, compared to the PE produced in the presence of an olefin polymerisation catalyst.

The preferred embodiment is the second embodiment, where the polyolefin (a) is a polyethylene which is produced in a high pressure polymerisation (HP) process and bears hydrolysable silane groups. In this preferable second embodiment, such hydrolysable silane groups bearing LDPE polymer as polyolefin (a) may be a low density homopolymer of ethylene (referred herein as LDPE homopolymer) or a low density copolymer of ethylene with at least one other comonomer (referred herein as LDPE copolymer), wherein the hydrolysable silane group(s) containing compound is incorporated to said LDPE polymer by grafting or a low density copolymer of ethylene with at least the silane group(s) containing comonomer, which is preferably as defined above, and optionally with one or more other comonomer (referred herein as LDPE copolymer). The one or more other comonomer(s) of LDPE copolymer are preferably selected from polar comonomer(s), non-polar comonomer(s) or from a mixture of polar comonomer(s) and non-polar comonomer(s), as defined above or below. Moreover, said LDPE homopolymer or LDPE copolymer as said polyolefin (a) may optionally be unsaturated.

As a polar comonomer, if present, for the LDPE copolymer bearing hydrolysable silane groups as the preferred polyolefin (a), a polar comonomer is preferably selected from a comonomer containing hydroxyl group(s), alkoxy group(s), carbonyl group(s), carboxyl group(s), ether group(s) or ester group(s), or a mixture thereof. Moreover, comonomer(s) containing carboxyl and/or ester group(s) are more preferable as said polar comonomer. Still more preferably, the polar comonomer(s), if present, of hydrolysable silane groups bearing LDPE copolymer is selected from the groups of acrylate(s), methacrylate(s) or acetate(s), or any mixtures thereof. If present in said hydrolysable silane groups bearing LDPE copolymer, the polar comonomer(s) is preferably selected from the group of alkyl acrylates, alkyl methacrylates or vinyl acetate, or a mixture thereof, more preferably from $C_1$- to $C_6$-alkyl acrylates, $C_1$- to $C_6$-alkyl methacrylates or vinyl acetate. Still more preferably, if polar comonomer(s) are present, then the hydrolysable silane groups bearing LDPE copolymer is a copolymer of ethylene with $C_1$- to $C_4$-alkyl acrylate, such as methyl, ethyl, propyl or butyl acrylate, or vinyl acetate, or any mixture thereof, which bears hydrolysable silane groups.

As the non-polar comonomer(s), if present, for the LDPE copolymer bearing hydrolysable silane groups as the preferred polyolefin (a), comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=One double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond, such as diene) comonomer(s); or any mixtures thereof.

If the LDPE polymer bearing hydrolysable silane groups as the preferred polyolefin (a) is a copolymer of ethylene with other comonomer(s), then the amount of the other comonomer(s) present in said LDPE polymer is preferably from 0.001 to 50 wt.-%, more preferably from 0.05 to 40 wt.-%, still more preferably less than 35 wt.-%, still more preferably less than 30 wt.-%, more preferably less than 25 wt.-%.

As already mentioned, the silane group(s) can be incorporated to the high pressure polyethylene, preferably to the LDPE polymer, as the preferred polyolefin (a) by grafting or by copolymerizing ethylene with a silane group(s) containing comonomer and optionally with other comonomer(s). In this preferred second embodiment the polyolefin (a) is a HP polyethylene bearing hydrolysable silane groups, and is most preferably a LDPE copolymer of ethylene with a silane group containing comonomer as defined above and optionally with other comonomer(s).

Typically, and preferably in wire and cable (W&C) applications, the density of the LDPE polymer bearing hydrolysable silane groups as the polyolefin (a), is higher than 860 kg/m$^3$. Preferably the density of such LDPE polymer, is not higher than 960 kg/m$^3$, and preferably is from 900 to 945 kg/m$^3$. The MFR$_2$ (2.16 kg, 190° C.) of the LDPE polymer bearing hydrolysable silane groups as the polyolefin (a), is preferably from 0.01 to 50 g/10 min, more preferably from 0.01 to 40.0 g/10, more preferably is from 0.1 to 20 g/10 min, and most preferably is from 0.2 to 10 g/10 min.

Accordingly, the LDPE polymer for the polyolefin (a) is preferably produced at high pressure by free radical initiated polymerisation (referred to as high pressure (HP) radical polymerization). The HP reactor can be e.g. a well known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

The polyolefin bearing hydrolysable silane groups (a) is most preferably selected from a homopolymer or copolymer of ethylene produced in a low pressure polymerisation process in the presence of a coordination catalyst, as defined above, and grafted with a silane group bearing compound, as defined above, or from a copolymer of ethylene produced in a high pressure polymerisation process, as defined above or below, by copolymerising ethylene with at least one silane group(s) bearing comonomer, as defined above or below, and, optionally, with one or more other comonomer(s). More preferably, the polyolefin bearing hydrolysable silane groups (a) has been obtained by copolymerisation of ethylene in a high pressure process with at least silane group bearing comonomer as defined above, and, optionally, with one or more other comonomer(s).

The Polymer Composition (=Polymer Composition of the Invention)

The polymer composition preferably comprises the silanol condensation catalyst compound of formula (I) or (II) in an amount of 0.0001 wt % or more, preferably up to 6.0 wt %, preferably 0.01 to 2.0 wt %, more preferably 0.02 to 0.5 wt %, based on the combined amount of the polyolefin (a) and silanol condensation catalyst compound of formula (I) or (II).

The polymer composition preferably comprises the polyolefin (a) in an amount of 99.9999 wt % or less, preferably at least 94.0 wt % or more, preferably of 99.99 to 98.0 wt %, more preferably of 99.98 to 99.5 wt %, based on the combined weight of the polyolefin (a) and the silanol condensation catalyst compound of formula (I) or (II).

Preferably, the polymer composition comprises hydrolysable silane group(s) in an amount of from 0.001 to 12 mol %, preferably of from 0.01 to 4 mol %, most preferably of from 0.05 to 1.6 mol %, based on the total amount (weight) of the polymer composition. More preferably the mol % amount (calculated from the wt % as determined below under "Determination methods") of the hydrolysable silane group(s) is based on the total amount of the polyolefin (a) component.

"Silane group" means herein the hydrolysable silane moiety. Preferable silane-moiety is (Y)$_{3-q}$Si— moiety as defined above in formula (Ic) which is crosslinkable by hydrolysation and subsequent condensation reaction in the presence of a silanol condensation catalyst and water, as known in the art, to form Si—O—Si links between other hydrolysable silane-groups present in said polyolefin (a) component. Preferred hydrolysable silane-group is a hydrolysable (AO)$_3$Si-moiety as defined above in formula (IIc).

The polymer composition may contain further components, such as further polymer component(s), like miscible thermoplastic(s), additive(s), such as antioxidant(s), further stabilizer(s), e.g. water treeing retardant(s), scorch retardant(s); lubricant(s), foaming agent(s), filler(s), such as carbon black; or colorant(s).

The total amount of further polymer component(s), if present, is typically up to 60 wt %, preferably up 50 wt %, preferably up 40 wt %, more preferably from 0.5 to 30 wt %, preferably from 0.5 to 25 wt %, more preferably from 1.0 to 20 wt %, based on the total amount of the polymer composition.

The total amount of additive(s), if present, is generally from 0.01 to 10 wt %, preferably from 0.05 to 7 wt %, more preferably from 0.2 to 5 wt %, based on the total amount of the polymer composition. The polymer composition may, and preferably, comprise antioxidant(s), preferably antioxidant(s) which is preferably neutral or acidic, and preferably comprises a sterically hindered phenol group or aliphatic sulphur groups. Examples of suitable antioxidants for stabilisation of polyolefins containing hydrolysable silane groups which are crosslinked with a silanol condensation catalyst, in particular an acidic silanol condensation catalyst are disclosed in EP 1254923. Other preferred antioxidants are disclosed in WO 2005003199A1. Preferably, the antioxidant is present in the composition in an amount of from 0.01 to 3 wt %, more preferably 0.05 to 2 wt %, and most preferably 0.08 to 1.5 wt %, based on the total amount of the polymer composition.

The polymer composition may comprise a filler(s), e.g. a conductive filler, such as a conductive carbon black, if used as semiconductive compositions; or a flame retardant filler(s), such as magnesium or aluminium hydroxide, if used as flame retardant composition; or a UV protecting filler(s), such as UV-carbon black or UV stabiliser, if used as UV-stabilised composition; or any combination(s) thereof. The amount of the filler in general depends on the nature of the filler and the desired end application, as evident for a skilled person. E.g. when the polymer composition comprises conductive filler, then the amount thereof is of up to 65 wt %, preferably from 5 to 50 wt %, based on the total amount of the polymer composition.

The polymer composition may comprise a colorant which is then typically added to the composition in form of a color master batch. Such color master batches may be commercially available or may be prepared in a conventional manner by combining the colorant with a carrier medium. The amount of colorant master batch, if present, is preferably up to 5 wt %, more preferably from 0.1 to 3 wt %, based on the total amount of the polymer composition.

The amount of polyolefin (a) in the polymer composition of the invention is typically of at least 35 wt %, preferably of at least 40 wt %, preferably of at least 50 wt %, preferably of at least 75 wt %, more preferably of from 80 to 100 wt % and more preferably of from 85 to 100 wt %, based on the total amount of the polymer component(s) present in the polymer composition. The preferred polymer composition consists of polyolefin (a) as the only polymer components. The expression means that the polymer composition does not contain further polymer components, but the polyolefin (a) as the sole polymer component. However, it is to be understood herein that the polymer composition may comprise further component(s) other than the polyolefin (a) component, such as additive(s) which may optionally be added in a mixture with a carrier polymer in so called master batch. Also the compound of formula (I) or (II) can be added in form of a master batch, wherein the carrier medium is a polymer. In such cases the carrier polymer of the master batch is not calculated to the amount of the polymer components, but to the total amount of the polymer composition.

Accordingly, the present invention further provides a master batch (MB) comprising
  (i) a carrier medium selected from a liquid or solid carrier, preferably from a liquid or carrier polymer, wherein the amount of the carrier medium is of 30 wt % or more, preferably of 40 or more, more preferably of 50 wt % or more, based on the total amount of the MB,
  (ii) a silanol condensation catalyst compound of formula (I) or (II) as defined above or below, and
  (iii) optionally a further component(s) selected from further polymer component(s), additive(s), filler(s) or colorant(s), or any mixtures thereof.

The liquid carrier is typically an inert fluid or, in case of one or more additives, one of the additives can be in liquid form at the operating temperature and can also act as a carrier. The compound of formula (I) or (II) and optional additive(s) can each independently be dissolved, molten or dispersed to the liquid.

The solid carrier can be in form of a powder which is mixed together with the compound of formula (I) or (II) to form the MB mixture. Alternatively, and preferably, the solid carrier is a carrier polymer. The compound of formula (I) or (II) can be added to the carrier polymer and the mixture is meltmixed and then pelletised to form the MB. Further alternatively, and preferably, the compound of formula I or II is impregnated to the pellets of the carrier polymer. The pellets of the MB are then added to the polyolefin (a). The carrier polymer can be any polymer suitable for the polyolefin (a), preferably is selected from a polyolefin as defined below under polyolefin (a).

Furthermore, preferably the MB may contain further component(s), such as additive(s), e.g. part or all of the additive(s) of the polymer composition, for example the stabilizer(s), lubricant(s), drying agents(s); filler(s), such as carbon black(s); colorant(s), or any mixtures thereof. The preferred amount of the further component(s) present in the MB is up to 50 wt %. The total amount of the MB is 100 wt %.

The master batch preferably comprises the compound of formula (I) or (II) in an amount of from 0.3 to 15 wt %, more preferably from 0.7 to 10 wt %, based on the total amount of the MB.

The MB is preferably mixed with the polyolefin (a) in an amount of up to 30 wt %, preferably up to 20 wt %, preferably from 1 to 15 wt %, more preferably from 2 to 10 wt %, based on the combined amount of the polyolefin (a) and MB. It is noted that the total amount of the compound of formula (I) or (II) in the polymer composition is as defined above and means the amount of the compound of formula (I) or (II) as such (neat).

The polymer composition of the invention can be produced before or after producing a shaped article.

In a first embodiment for producing the polymer composition, the polyolefin (a) and the compound of formula (I) or (II) are combined together before formation of a shaped article, e.g. a cable layer. The compound of formula (I) or (II) can be added as such, i.e. as a neat compound of formula (I) or (II), or in form of the MB, to the polyolefin (a). The components are preferably combined together by compounding in a conventional manner, e.g. by extruding the components with a screw extruder or a kneader. The obtained meltmixture is preferably pelletised and the pellets of the polymer composition, which can be of any size and shape, are used in the article production process. Alternatively, in this first embodiment for producing the polymer composition the preparation of the polymer composition or an addition of part of the other component(s) thereof, such as the compound (I) or (II) or additive(s), or any mixture thereof, can be carried out during the article production process, e.g. in a cable production line, e.g. in a mixer preceding the cable extruder or in the cable extruder, or in both. The obtained mixture is then used to form a shaped article, such as a cable layer.

In this first embodiment it is preferred that the polyolefin (a) and a compound of formula (I) or (II) are compounded before article production process, and the obtained polymer composition, preferably in form of pellets, is then introduced to the article production process.

In the second embodiment, the compound of formula (I) or (II) is combined together with the polyolefin (a) after the formation of a shaped article from the polyolefin (a). For instance the compound of formula (I) or (II) can migrate to a cable layer of polyolefin (a) from another layer adjacent to said layer and thus the polymer composition is formed after the layer production and e.g. before or during the crosslinking of the layer.

The first or second embodiment for producing the polymer composition can be chosen depending on the desired end application, i.e. an article, of the polymer composition.

End Use of the Polymer Composition

The invention also provides an article comprising a polymer composition which comprises a polyolefin (a) and a compound of formula (I) or (II) as defined above or below in claims.

The preferred article is a power cable, more preferably a LV, MV or HV cable, which comprises a conductor surrounded by at least one layer comprising, preferably consisting of, a polymer composition which comprises a polyolefin bearing hydrolysable silane groups (a) and a silanol condensation catalyst compound of formula (I) or (II) (b), as defined above or below.

The preferred power cable is selected from
  a cable (A) comprising a conductor surrounded by at least an insulating layer comprising, preferably consisting of, a polymer composition which comprises a polyolefin (a) and a compound of formula (I) or (II), as defined above or below in claims; or
  a cable (B) comprising a conductor surrounded by an inner semiconductive layer, an insulating layer and an outer semiconductive layer, wherein at least one layer, preferably at least the insulation layer, comprises, preferably consists of, the polymer composition which comprises a polyolefin (a) and a compound of formula (I) or (II), as defined above or below in claims.

The cable (A) is preferably a LV or a MV cable. The cable (B) is preferably a MV cable or a HV cable.

In the embodiment of cable (B), the first and the second semiconductive compositions can be different or identical and comprise a polymer(s) which is preferably a polyolefin or a mixture of polyolefins and conductive filler, preferably carbon black. In case of cable (B), preferably, the insulating layer and, optionally and preferably, one or both, preferably both, of the inner semiconductive layer and the outer semiconductive layer comprise a polymer composition of the invention. In this case the polyolefin (a) and/or the compound of formula (I) or (II) of the polymer compositions of the layers can be same or different.

The term "conductor" means herein above and below that the conductor comprises one or more wires. Moreover, the cable may comprise one or more such conductors. Preferably the conductor is an electrical conductor and comprises one or more metal wires.

In the preferred cable of the invention at least the insulation layer comprises the polymer composition.

Insulating layers for medium or high voltage power cables generally have a thickness of at least 2 mm, typically at least 2.3 mm, and the thickness increases with increasing voltage the cable is designed for.

As well known the cable can optionally comprise further layers, e.g. layers surrounding the insulation layer or, if present, the outer semiconductive layers, such as screen(s), a jacketing layer(s), other protective layer(s) or any combinations thereof.

The polymer composition of the invention is preferably crosslinked.

Accordingly, the polymer composition of the invention is preferably crosslinkable. "Crosslinkable" means that the polymer composition can be crosslinked using the compound of formula (I) or (II) before the use in the end application thereof. Furthermore, the article, preferably the cable, of the invention is crosslinkable and crosslinked before the end use thereof.

Preferably a crosslinked article, preferably a cable, is provided, comprising a conductor surrounded by at least one layer, preferably at least an insulating layer, has been crosslinked using the compound of formula (I) or (II) as defined above or below. The crosslinked cable is novel as such, since the layer of the polymer composition contains the residues of the compound of formula (I) or (II).

The invention further provides a process for producing an article comprising a step of forming an article using the polymer composition as defined above or below.

The preferred process is a process for producing a cable of the invention as defined above, whereby the process comprises the step of applying on a conductor, preferably by (co)extrusion, one or more layers, wherein at least one layer comprises, preferably consists of, the polymer composition which comprises (a) a polyolefin bearing hydrolysable silane groups and
(b) a silanol condensation catalyst compound of formula (I) or (II), as defined above or below in claims.

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer. (Co)extrusion can be effected in any conventional cable extruder, e.g. a single or twin screw extruder.

As well known a meltmix of the polymer composition or component thereof, is applied to form a layer. Meltmixing means mixing above the melting point of at least the major polymer component(s) of the obtained mixture and is carried out for example, without limiting to, in a temperature of at least 15° C. above the melting or softening point of polymer component(s). The meltmixing can be carried out in the cable extruder or in the mixer, e.g. kneader, preceding the extruder, or in both.

The more preferable cable process produces:
(i) a cable (A), wherein the process comprises the steps of
   applying on a conductor, preferably by (co)extrusion, at least an insulation layer comprising, preferably consisting of, a polymer composition which comprises a polyolefin (a) and a compound of formula (I) or (II), as defined above or below in claims, or
(ii) a cable (B), wherein the process comprises the steps of
   applying on a conductor, preferably by (co)extrusion, an inner semiconductive layer comprising a first semiconductive composition, an insulation layer comprising an insulation composition and an outer semiconductive layer comprising a second semiconductive composition, in that order,
   wherein the composition of at least one layer, preferably at least the insulation composition of the insulation layer comprises, preferably consists of, a polymer composition which comprises
      a polyolefin (a) and a compound of formula (I) or (II), as defined above or below in claims.

In this embodiment of cable (B), the first and the second semiconductive compositions can be different or identical and comprise a polymer(s) which is preferably a polyolefin or a mixture of polyolefins and conductive filler, preferably carbon black.

As well known, the polymer composition of the layer(s) of the cable can be produced before or during the cable production process. Moreover the polymer composition(s) of the layer(s) can each independently comprise part or all of the components of the final composition, before introducing to the (melt)mixing step a) of the cable production process. Then the remaining component(s) are introduced during or after cable formation.

In the preferred cable at least the insulation layer comprises, preferably consists of, the polymer composition. In this embodiment the polyolefin (a) and the compound of formula (I) or (II) of the polymer composition are combined according to the first embodiment of the preparation process of the polymer composition as described above, i.e. before the polymer composition is introduced, preferably in pellet form, to the cable production line.

In case one or two of the semiconductive layers of cable (B) comprise, preferably consist of, the polymer composition, then the polymer composition is preferably prepared according to the second embodiment of the preparation process of the polymer composition as described above, i.e. after the layer formation using polyolefin (a). Then the compound of formula (I) or (II) can migrate from an adjacent layer, typically insulation layer, to the formed semiconductive layer.

The article production process of the invention comprises preferably a further step of crosslinking the produced article. According to a preferred embodiment of said process a crosslinked cable is produced, wherein the process comprises a further step of crosslinking the obtained at least one layer comprising a polymer composition as defined above or below in claims. The crosslinking is carried out in the presence of the compound of formula (I) or (II) and water, also called as moisture curing. Water can be in form of a liquid or vapour, or a combination thereof. The silane groups present in the polyolefin (a) are hydrolysed under the influence of water in the presence of the present silanol condensation catalyst compound of formula (I) or (II) resulting in the splitting off of alcohol and the formation of silanol groups, which are then crosslinked in a subsequent condensation reaction wherein water is split off and Si—O—Si links are formed between other hydrolysed silane groups present in said polyolefin (a). The crosslinked polymer composition has a typical network, i.a. interpolymer crosslinks (bridges), as well known in the field. Usually, moisture curing is performed in ambient conditions or in a so called sauna or water bath at temperatures of 70 to 100° C.

Moreover, the cable production process preferably comprises a further step of
(i) crosslinking the insulation composition of the insulation layer of the cable (A) in the presence of a compound of formula (I) or (II) as defined above or below in claims and water, or
(ii) crosslinking at least one of the insulation composition of the insulation layer, the first semiconductive composition of the inner semiconductive layer or the second semiconductive composition of the outer semiconductive layer of the cable (B),
    preferably crosslinking at least the insulation composition of the insulation layer,
    more preferably crosslinking the insulation composition of the insulation layer and at least one of the first semiconductive composition of the inner semiconductive layer and the second semiconductive composition of the outer semiconductive layer,
    more preferably crosslinking the insulation composition of the insulation layer, the first semiconductive composition of the inner semiconductive layer, and, optionally, and preferably, the second semiconductive composition of the outer semiconductive layer,
    in the presence of a compound of formula (I) or (II) (b) as defined above or below and water.

In case of cable (B), preferably, the inner semiconductive layer, the insulating layer and the outer semiconductive layer are crosslinked.

In case of cable (B), more preferably, the inner semiconductive layer, the insulating layer and the outer semiconductive layer comprise a polymer composition of the invention, and are preferably crosslinked.

The outer semiconductive layer can be bonded or strippable, which terms have a well known meaning.

A crosslinked cable obtainable by the process is also provided.

Furthermore, the invention provides a use of a compound of formula (I) or (II) as defined above or below for crosslinking a polyolefin (a) as defined above or below, more preferably for crosslinking at least one layer of a cable comprising the polyolefin (a) as defined above or below.

Determination Methods
Wt %: % by weight
Total amount means weight, if in %, then 100 wt %. E.g. the total amount (100 wt %) of the polymer composition.
Melt Flow Rate The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene. MFR may be determined at different loadings such as 2.16 kg ($MFR_2$) or 21.6 kg ($MFR_{21}$).
Density Low density polyethylene (LDPE): The density was measured according to ISO 1183-2.

The sample preparation was executed according to ISO 1872-2 Table 3 Q (compression moulding).

Low process polyethylene: Density of the polymer was measured according to ISO 1183/1872-2B.
Gel Content Tape samples as prepared below in experimental part under "Tape sample preparation" were used to determine the gel content according to ASTM D 2765-01, Method B, using decaline extraction, with the following two deviations from this standard:
1) An addition extraction for 1 hour with new decaline was done in order to secure that all solubles were extracted.
2) Only 0.05% antioxidant (Irganox 1076) was added to the decalin instead of 1% as specified in the standard.

The gel content was then calculated according to said ASTM D 2765-01.
Hot Set Elongation Test Tape samples as prepared below in experimental part under "Tape sample preparation" were used to determine the hot set properties. Three dumb-bells sample, taken out along extrusion direction were prepared according to ISO527 5A from the 1.7+−0.1 mm thick crosslinked tape. The hot set test were made according to EN60811-2-1 (hot set test) by measuring the thermal deformation.

Reference lines, were marked 20 mm apart on the dumbbells. Each test sample was fixed vertically from upper end thereof in the oven and the load of 0.1 MPa are attached to the lower end of each test sample. After 15 min, 200° C. in oven the distance between the pre-marked lines were measured and the percentage hot set elongation calculated, elongation %. For permanent set %, the tensile force (weight) was removed from the test samples and after recovered in 200° C. for 5 minutes and then let to cool in room temperature to ambient temperature. The permanent set % was calculated from the distance between the marked lines The average of the three test were reported.
Content (wt % and mol %) of polar comonomer:

Comonomer content (wt %) of the polar comonomer was determined in a known manner based on Fourier transform infrared spectroscopy (FTIR) determination calibrated with $^{13}$C-NMR as described in Haslam J, Willis H A, Squirrel D C. Identification and analysis of plastics, $2^{nd}$ ed. London Iliffe books; 1972. FTIR instrument was a Perkin Elmer 2000, 1scann, resolution 4 $cm^{-1}$. For determination of the comonomers, films with thickness 0.1 mm were prepared. The peak for the used comonomer was compared to the peak of polyethylene as evident for a skilled person (e.g. the peak for butyl acrylate at 3450 $cm^{-1}$ was compared to the peak of polyethylene at 2020 $cm^{-1}$). The weight-% was converted to mol-% by calculation based on the total moles of polymerisable monomers.

Content (mol-%) of Hydrolysable Silane Group(s) $(Si(Y)_{3-q})$ Using X-ray Fluorescence Analysis:

The pellet sample was pressed to a 3 mm thick plaque (150° C. for 2 minutes, under pressure of 5 bar and cooled to room temperature). Si-atom content was analysed by wavelength dispersive XRF (AXS S4 Pioneer Sequential X-ray Spectrometer supplied by Bruker). The pellet sample was pressed to a 3 mm thick plaque (150° C. for 2 minutes, under pressure of 5 bar and cooled to room temperature).

Generally, in XRF-method, the sample is irradiated by electromagnetic waves with wavelengths 0.01-10 nm. The elements present in the sample will then emit fluorescent X-ray radiation with discrete energies that are characteristic for each element. By measuring the intensities of the emitted energies, quantitative analysis can be performed. The quantitative methods are calibrated with compounds with known concentrations of the element of interest e.g. prepared in a Brabender compounder.

The XRF results show the total content (wt %) of Si and are then calculated and expressed herein as Mol %-Content of hydrolysable silane group(s) $(Si(Y)_{3-q})$.

Experimental Part

Preparation of Examples

Base Polyolefin (a)
Polyolefin I:
Commercially available copolymer of ethylene with vinyl trimethoxy silane (VTMS) comonomer, LE4423, supplier Borealis, VTMS content of the copolymer of 1.35 wt % (0.26 mol %), MFR of 1.0 g/10 min (190° C./2.16 kg) and density of 923 kg/m3, produced the high pressure polymerisation, in a tubular reactor.
Reference Master Batch:
Reference Catalyst:
Conventional tin catalyst, dioctyltin laurate.
Master batch of catalyst: The master batch was prepared by impregnating of dioctyltin laurate to pellets of a conventional ethylene butyl acrylate copolymer produced in a high pressure in a tubular reactor (butyl acrylate, BA, content 15 wt %) as the carrier polymer. The obtained master batch contained 3.5 wt % of the catalyst based on the final amount of the master batch.
Inventive Master Batches 1 to 7:
Inventive Catalyst 1:
Isopropyl triisostearoyl titanate, CAS-nr: 61417-49-0 (Commercially available under name KR TTS, supplier Kenrich)

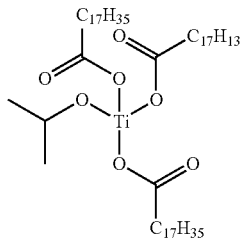

Inventive Catalyst 2:
Isopropyl, tri(dioctylpyrophosphato)titanate, CAS-nr: 68585-78-4 (Commercially available under name KR 38S, supplier Kenrich)

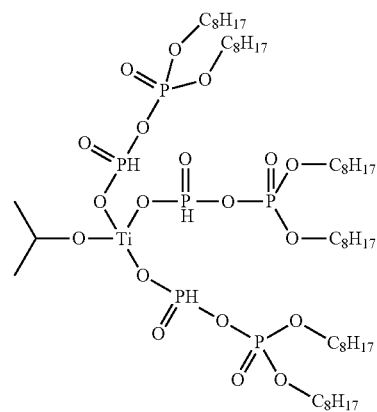

Inventive Catalyst 3:
Isopropyl, tri(dodecylbenzenesulfonate)titanate, CAS-nr: 61417-55-8 (Commercially available under name Ken React KR 9S, supplier Kenrich)

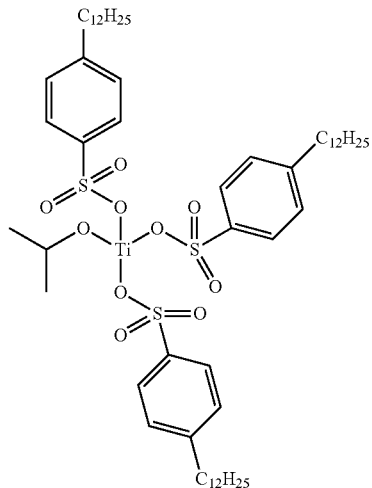

Inventive Catalyst 4:
Titanium, [2,2-bis[(2-propenyloxy-)methyl]-1-butanolato-]tris(dodecylbenzenesulfonato), CAS-nr: 103406-74-2 (Commercially available under name Ken React LICA09, supplier Kenrich)

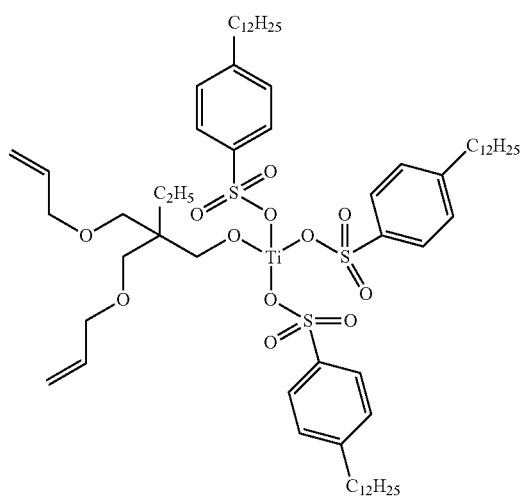

Inventive Catalyst 5:

Titanium, [2,2-bis[(2-propenyloxy-)methyl]-1-butanolato-]tris(neodecanoato), CAS-nr: 103334-85-6 (Commercially available under name Ken React LICA 01, supplier Kenrich)

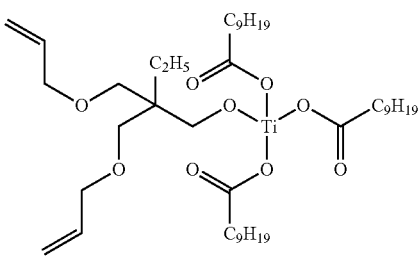

Inventive Catalyst 6:

Zirconium, [2,2-bis[(2-propenyloxy-)methyl]-1-butanolato-]tris(dodecylbenzenesulfonato-O—), CAS-nr: 109766-35-0 (Commercially available under name Ken React NZ 09, supplier Kenrich)

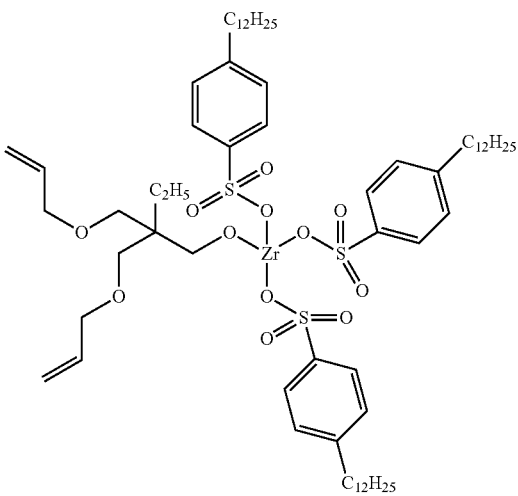

Inventive Catalyst 7:

Zirconium, [2,2-bis[(2-propenyloxy-)methyl]-1-butanolato-]tris(neodecanoato), CAS-nr: 110392-54-6 (Commercially available under name Ken React NZ 01, supplier Kenrich)

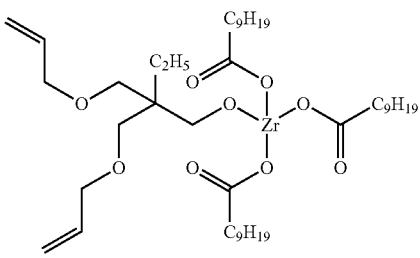

Master Batch Preparation:

Seven separate master batches were prepared. Inventive master batch 1 to 7 were prepared by impregnating the inventive catalyst 1 to 7, respectively, to pellets of a conventional ethylene butyl acrylate copolymer (butyl acrylate, BA, content 17 wt %). The obtained inventive master batch 1 contained 4.2 wt % of the inventive catalyst 1, the obtained inventive master batch 2 contained 5.8 wt % of the inventive catalyst 2, the obtained inventive master batch 3 contained 4.8 wt % of the inventive catalyst 3, the obtained inventive master batch 4 contained 5.4 wt % of the inventive catalyst 4, the obtained inventive master batch 5 contained 3.4 wt % of the inventive catalyst 5, the obtained inventive master batch 6 contained 5.6 wt % of the inventive catalyst 6 and the obtained inventive master batch 7 contained 3.6 wt % of the inventive catalyst 7.

Tape Sample Preparation:

Tape samples were prepared by conventional compounding, i.e. meltmixing, in a tape extruder (Collin Teach-Line Extruder, Type: E 20 T SCD 15, settings disclosed in table 1) the polyolefin component of test compositions together with the above inventive master batchs or, respectively, the reference master batch, to obtain a test polymer composition containing the catalyst in amounts as specified in the below tables 2-6, and with or without 1 wt % of a white colorant based on the total amount of the polymer composition. The white colorant commercial, available under trade name Polyone 2000-WT-50, (supplied by PolyOne Sweden AB).

TABLE 1

| Compounding conditions | | | | | | | |
|---|---|---|---|---|---|---|---|
| Set Values Temperature [° C.] | | | | | | Extruder | |
| Zon 1 | Zon 2 | Zon 3 | Zon 4 | Zon 5 | Zon 6 | Speed [rpm] | Output [kg/h] |
| 60 | 150 | 160 | 170 | 170 | 170 | 30 | 0.8 |

The obtained tape samples (with 1.8±0.1 mm in thickness) were used for crosslinking and for determining gel content and hot set.

Crosslinking was effected in two different conditions: either the obtained tape sample was kept in water bath at 90° C. or in ambient conditions, at 23° C. and 50% relative humidity, and let crosslinking to occur for different time periods as specified in the below tables. Accordingly, hot set elongation was measured after crosslinking 4, 7 and 24 h in water bath at 90° C. and after 8 days in ambient conditions at 23° C. Gel content was also measured after 24 h in water bath at 90° C. and 8 days in ambient conditions at 23° C.

The components and their amounts of the inventive and reference compositions, the crosslinking conditions and period, as well as the results of the measurements are given in table 2-6.

TABLE 2

| Catalytic effect of the Inventive composition 1 compared to Reference composition 1 | | | | | | |
|---|---|---|---|---|---|---|
| | Hot set 4 h[1,3] | Hot set 7 h[1,3] | Hot set 24 h[1,3] | Hot set 8 days[2,3] | Gel level 24 h[1] | Gel level 8 days[2] |
| Inv. Comp. 1 (2.3 mmol/kg of Inventive catalyst 1 in the final polymer composition) | 38.9 | 40.9 | 25 | 84 | 71.6 | 63.6 |

TABLE 2-continued

Catalytic effect of the Inventive composition 1 compared to Reference composition 1

|  | Hot set 4 h[1,3] | Hot set 7 h[1,3] | Hot set 24 h[1,3] | Hot set 8 days[2,3] | Gel level 24 h[1] | Gel level 8 days[2] |
|---|---|---|---|---|---|---|
| Ref. Comp. 1 (2.3 mmol/kg of ref. catalyst in Polyolefin I) | 33.5 | 26.1 | 16.3 | 221.6 | 77.9 | 56.1 |

[1]Crosslinking in water bath at 90° C., for the specified time period.
[2]Crosslinking in ambient conditions at 23° C. for the specified time period.
[3]Hot Set measured is Hot Set Elongation

TABLE 3

Catalytic effect of the Inventive composition 2 with higher concentration

|  | Hot set 4 h[1,3] | Hot set 7 h[1,3] | Hot set 24 h[1,3] | Hot set 8 days[2,3] | Gel level 24 h[1] | Gel level 8 days[2] |
|---|---|---|---|---|---|---|
| Inv. Comp. 2 (6.9 mmol/kg of inventive catalyst 1 in Polyolefin I) | 5.8 | 12.1 | 8.4 | 24.7 | 74.3 | 66.2 |

[1]Crosslinking in water bath at 90° C., for the specified time period.
[2]Crosslinking in ambient conditions at 23° C. for the specified time period.
[3]Hot Set measured is Hot Set Elongation

TABLE 4

Catalytic effect of the Inventive composition 3[1]

|  | Hot set elongation 24 h[2] | Gel level 24 h |
|---|---|---|
| Inv. Comp. 3 (6.9 mmol/kg of inventive catalyst 2 in Polyolefin I) | 54.2 | 52.71 |

[1]Crosslinking in water bath at 90° C., for the specified time period
[2]Load of 0.2 MPa instead of 0.1 MPa

TABLE 5

Catalytic effect of the colored Inventive composition 4 compared to the colored Reference composition 2

|  | Hot set 8 days[2,3] | Gel level 8 days[2] |
|---|---|---|
| Inv. Comp. 1 (2.3 mmol/kg of inventive catalyst 1 and 1 wt % PolyOne 2000-WT-50 in Polyolefin I) | 81.8 | 59.5 |
| Ref. Comp. 2 (2.3 mmol/kg of ref. catalyst 1 and 1 wt % PolyOne 2000-WT-50 in Polyolefin I) | 242.1 | 57.2 |

[2]Crosslinking in ambient conditions at 23° C. for the specified time period.
[3]Hot Set measured is Hot Set Elongation

TABLE 6

Catalytic effect of the Inventive composition 5, 6, 7, 8 and 9[1]

|  | Gel level 24 h (Water bath 90° C.) |
|---|---|
| Inv. Comp. 5 (6.9 mmol/kg of inventive catalyst 3 in Polyolefin I) | 77 |
| Inv. Comp. 6 (6.9 mmol/kg of inventive catalyst 4 in Polyolefin I) | 70 |
| Inv. Comp. 7 (6.9 mmol/kg of inventive catalyst 5 in Polyolefin I) | 56 |
| Inv. Comp. 8 (6.9 mmol/kg of inventive catalyst 6 in Polyolefin I) | 73 |
| Inv. Comp. 9 (6.9 mmol/kg of inventive catalyst 7 in Polyolefin I) | 58 |

[1]Crosslinking in water bath at 90° C., for the specified time period

The invention claimed is:

1. A power cable which comprises a conductor surrounded by at least one layer comprising a polymer composition which comprises:
   (a) at least 35 wt % of a polyolefin bearing hydrolysable silane groups and
   (b) a silanol condensation catalyst compound of formula (I) or (II)

$$MeR^1{}_nR^2{}_mZ_o \quad (I),$$

$$(Z_oR^2{}_mR^1{}_nMe)\text{-}R^3\text{-}(MeR^1{}_nR^2{}_mZ_o) \quad (II),$$

wherein in formula (I)
   Me is a transition metal of group 4 of Periodic Table of the Elements (according to IUPAC nomenclature of inorganic industry 1989);
   n is an integer between 0 to 3;
   m is an integer between 0 to 4,
   o is an integer between 0 to 4, wherein n+m+o is 4, and at least m or o is other than 0;
   each $R^1$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s); and
   each $R^2$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s);
or is a group hydrolysable to a Brönsted acid; provided that if o is 0, then at least one $R^2$ is a group hydrolysable to a Brönsted acid;
or $R^1$ and $R^2$, or two $R^1$ groups or two $R^2$ groups form together with Me a ring system;
each Z is independently a halogen atom;
   or wherein in formula (II),
   Me and $R^1$ have the meaning as defined in formula (I) above, and $R^2$ has the meaning as defined in formula (I) above, but without the above proviso;
   n is an integer between 0 to 3
   m is an integer between 0 to 3
   o is an integer between 0 to 3, wherein n+m+o is 3; and
   $R^3$ independently has the meaning as defined for $R^1$ in formula (I) above or $R^2$ in formula (I) above, but without the above proviso.

2. A power cable according to claim 1, wherein in compounds (I) and (II) Me is Ti, Zr or Hf.

3. A power cable according to claim 1, wherein in compounds of formula (I): n is 1 to 3; m is 1 to 3 and, o is 0 or 1; and wherein in compounds of formula (II): n is 1 to 3; m is 1 to 3 and, o is 0 or 1.

4. A power cable according to claim 1, wherein in compounds (I) and (II) the heteroatom is selected from O, S, P, N, Si, B or halogen.

5. A power cable according to claim 1, wherein in compounds (I) and (II) each $R^1$ is independently $-X_w-R^1$, wherein w is 0 or 1; X is a heteroatom selected from O, S, P, N, Si, B or halogen; and $R^1$ is is selected a linear or branched (C1-C50)alkyl group, a linear or branched (C1-C30)alkyl group, a linear or branched (C1-C20)alkyl group; or a linear or branched (C1-C20)alkyl(O—(C1-C20)alkyl)$_p$, (C1-C20) alkyl(O—(C1-C20)alkenyl)$_p$ or (C1-C20)alkyl-O(C1-C20) alkyl)$_e$(C1-C20)alkenyl)$_f$, wherein each p is independently 1, 2 or 3, e is 0, 1 or 2 and f is 0, 1 or 2; or a linear or branched (C1-C12)alkyl(O—(C1-C12)alkyl)$_p$ or (C1-C12)alkyl(O—(C1-C12)alkenyl)$_p$, wherein each p is independently 1 or 2.

6. A power cable according to claim 1, wherein in compounds (I) and (II) at least 1 of $R^2$ is independently Y—$R^2$; Y is —OC(=O)—, —C(=O)—O—C(=O)—, —NR$^4$C (=O)—, —OC(=O)NR$^4$—, —OC(=O)O—, —NR$^4$C (=O)OR—, —C(=O)NC(=O)—, —OS(=O)$_2$—, —OP (=O)$_2$—, —NR$^4$S(=O)$_2$, —OS(=O)$_2$NR$^4$, —SC(=O)—, —OPR$^5$(=O)O, —OP(=O)(OR$^5$)O—, or —OPR$^5$(=O) OP(=O)(OR$^2$)O—, wherein each $R^4$ independently is H or a (C1-C8)alkyl group; and each $R^5$ independently is H or $R^2$; and each $R^2$ moiety is independently a substituted or unsubstituted saturated or partially unsaturated hydrocarbyl group which optionally contains one or more heteroatom(s); or a substituted or unsubstituted aromatic hydrocarbyl group which optionally contains one or more heteroatom(s).

7. A power cable according to claim 1, wherein the (b) silanol condensation catalyst compound of formula (I) or (II) is a subgroup (Ia) of the compounds of formula (I), wherein Me is Ti, Zr or Hf;

n is 1 or 2; m is 2 or 3; o is 0;

each $R^1$ is -Xw-$R^1$, wherein w is 0 or 1; X is O, S, P, N or Si; $R^1$ moiety is selected from an optionally substituted linear or branched, saturated or partially unsaturated hydrocarbyl group, a linear or branched (C1-C50)alkyl group;

a linear or branched (C1-C20)alkyl(O—(C1-C20)alkyl)$_p$, (C1-C20)alkyl(O—(C1-C20)alkenyl)$_p$ or (C1-C20) alkyl-O(C1-C20)alkyl)$_e$(C1-C20)alkenyl)$_f$, wherein each p is independently 1, 2 or 3, e is 0, 1 or 2 and f is 0, 1 or 2; and each $R^2$ is independently selected from a) —OC(=O)—$R^2$, —OP(=O)$_2$—$R^2$, —OPR$^5$(=O)OP (=O)(O—$R^2$)$_2$ (wherein $R^5$ is H), or —OP(=O)(OR$^5$) O—$R^2$, —OC(=O)—$R^2$ or —OPR$^5$(=O)OP(=O) (O—$R^2$)$_2$ (wherein $R^5$ is H); and each $R^2$ is independently selected from a substituted or unsubstituted saturated or partially unsaturated hydrocarbyl group which optionally contains one or more heteroatom(s) an optionally substituted linear or branched hydrocarbyl group; an optionally substituted linear or branched (C1-C50)alkyl group, an optionally substituted linear or branched (C2-C50) alkenyl group or an optionally substituted linear or branched (C2-C30)alkynyl group; a linear or branched (C1-C50)alkyl group, a linear or branched (C1-C30) alkyl group, linear or branched (C1-C20)alkyl group, and linear or branched (C1-C12)alkyl group; or from an optionally substituted mono or polycyclic aryl group which has 6 to 12 carbon atoms and which contains one or more heteroatoms an optionally substituted mono or polycyclic aryl group with carbon ring atoms, an optionally substituted phenyl group or a naphthyl group, a phenyl group, and wherein the aromatic hydrocarbyl group is substituted with 1 to 4 substituent(s), which are each independently selected from linear or branched, saturated or partially unsaturated hydrocarbyl group, linear or branched (C1-C50)alkyl groups, linear or branched (C1-C30)alkyl groups, from linear or branched (C1-C20)alkyl groups, and linear or branched (C1-C12)alkyl group; linear or branched (C1-C20)alkyl group, and each $R^2$ moiety is independently selected from linear or branched (C1-C12)alkyl group;

or (b) $R^2$ is —OS(=O)$_2$—$R^2$; and $R^2$ moiety is selected from an optionally substituted linear or branched (C2-C50) alkenyl group or an optionally substituted linear or branched (C2-C30)alkynyl group; a linear or branched (C1-C50)alkyl group, a linear or branched (C1-C30) alkyl group, linear or branched (C1-C20)alkyl group, and linear or branched (C1-C12)alkyl group; or from an optionally substituted mono or polycyclic aryl group which has 6 to 12 carbon atoms and which contains one or more heteroatoms as defined above, an optionally substituted mono or polycyclic aryl group with carbon ring atoms, an optionally substituted phenyl group or a naphthyl group, more preferably a phenyl group, and wherein the aromatic hydrocarbyl group is substituted with 1 to 4, substituent(s), which are each independently selected from linear or branched, saturated or partially unsaturated hydrocarbyl group front linear or branched (C1-C50)alkyl groups, from linear or branched (C1-C30)alkyl groups, linear or branched (C1-C20)alkyl groups, and from linear or branched (C1-C12) alkyl group.

8. A power cable according to claim 1 in which the (b) silanol condensation catalyst compound of formula (I) or (II) is present in an amount of 0.0001 to 6.0 wt %, based on the combined amount of the polyolefin bearing hydrolysable silane groups (a) and the silanol condensation catalyst compound (b).

9. A power cable according to claim 1, wherein the silanol condensation catalyst compound is according to formula (I).

10. A power cable according to claim 1, wherein the polyolefin bearing hydrolysable silane groups (a) is a copolymer of olefin with a silane group(s) bearing comonomer, and, optionally, with other comonomer(s); or is a homopolymer or copolymer of olefin with silane groups which are introduced by grafting a silane group(s) containing compound to the polyolefin polymer.

11. A power cable according to claim 1, wherein the polyolefin bearing hydrolysable silane groups (a) is a polypropylene or polyethylene, a polyethylene produced in a the presence of an olefin polymerisation catalyst or a polyethylene produced in a high pressure process, which bears hydrolysable silane groups.

12. A power cable according to claim 1, wherein the polymer composition comprises hydrolysable silane groups in an amount of from 0.001 to 12 mol %, based on the total amount of the polymer composition.

13. A power cable selected from cable (A) comprising a conductor surrounded by at least an insulating layer comprising, a polymer composition which comprises (a) at least 35 wt % of a polyolefin bearing hydrolysable silane groups and (b) a silanol condensation catalyst compound of formula (I) or (II), or cable (B) comprising a conductor surrounded by an inner semiconductive layer, an insulating layer and an outer semiconductive layer, wherein at least one layer, preferably at least the insulation layer, comprises, preferably consists of, the polymer composition which comprises
(a) at least 35 wt % of a polyolefin bearing hydrolysable silane groups and
(b) a silanol condensation catalyst compound of formula (I) or (II),
wherein formula (I) and (II) are $$MeR^1{}_nR^2{}_mZ_o \qquad (I),$$

$$(Z_oR^2{}_mR^1{}_nMe)\text{-}R^3\text{-}(MeR^1{}_nR^2{}_mZ_o) \qquad (II),$$

wherein in formula (I)
Me is a transition metal of group 4 of Periodic Table of the Elements;
n is an integer between 0 to 3;
m is an integer between 0 to 4,
o is an integer between 0 to 4, wherein n+m+o is 4, and at least m or o is other than 0;
each $R^1$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s); and
each $R^2$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s);
or is a group hydrolysable to a Brönsted acid; provided that if o is 0, then at least one $R^2$ is a group hydrolysable to a Brönsted acid;
or $R^1$ and $R^2$, or two $R^1$ groups or two $R^2$ groups form together with Me a ring system;
each Z is independently a halogen atom;
or wherein in formula (II),
Me and $R^1$ have the meaning as defined in formula (I) above, and $R^2$ has the meaning as defined in formula (I) above, but without the above proviso;
n is an integer between 0 to 3
m is an integer between 0 to 3
o is an integer between 0 to 3, wherein n+m+o is 3; and
$R^3$ independently has the meaning as defined for $R^1$ in formula (I) above or $R^2$ in formula (I) above, but without the above proviso.

14. A process for producing a power cable, whereby the process comprises the step of
applying on a conductor by (co)extrusion, one or more layers, wherein at least one layer comprises a polymer composition which comprises
(a) at least 35 wt % of a polyolefin bearing hydrolysable silane groups and
(b) a silanol condensation catalyst compound of formula (I) or (II),
for producing
(i) a cable (A), wherein the process comprises the steps of
applying on a conductor by (co)extrusion, at least an insulation layer comprising a polymer composition which comprises
(a) at least 35 wt % of a polyolefin bearing hydrolysable silane groups and
(b) a silanol condensation catalyst compound of formula (I) or (II), or
(ii) a cable (B), wherein the process comprises the steps of
applying on a conductor by (co)extrusion, an inner semiconductive layer comprising a first semiconductive composition, an insulation layer comprising an insulation composition and an outer semiconductive layer comprising a second semiconductive composition, in that order, wherein the composition of at least one layer, comprises, a polymer composition which comprises
(a) at least 35 wt % of a polyolefin bearing hydrolysable silane groups and
(b) a silanol condensation catalyst compound of formula (I) or (II)
wherein formula (I) and (II) are $$MeR^1{}_nR^2{}_mZ_o \qquad (I),$$

$$Z_oR^2{}_mR^1{}_nMe)\text{-}R^3\text{-}(MeR^1{}_nR^2{}_mZ_o) \qquad (II),$$

wherein in formula (I)
Me is a transition metal of group 4 of Periodic Table of the Elements;
n is an integer between 0 to 3;
m is an integer between 0 to 4,
o is an integer between 0 to 4, wherein n+m+o is 4, and at least m or o is other than 0;
each $R^1$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s); and
each $R^2$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s);
or is a group hydrolysable to a Brönsted acid; provided that if o is 0, then at least one $R^2$ is a group hydrolysable to a Brönsted acid;
or $R^1$ and $R^2$, or two $R^1$ groups or two $R^2$ groups form together with Me a ring system;
each Z is independently a halogen atom;
or wherein in formula (II),
Me and $R^1$ have the meaning as defined in formula (I) above, and $R^2$ has the meaning as defined in formula (I) above, but without the above proviso;
n is an integer between 0 to 3
m is an integer between 0 to 3
o is an integer between 0 to 3, wherein n+m+o is 3; and
$R^3$ independently has the meaning as defined for $R^1$ in formula (I) above or $R^2$ in formula (I) above, but without the above proviso.

15. The process according to claim 14 wherein the process comprises a further step of crosslinking the obtained at least one layer comprising a polymer composition in the presence of water, by
(i) crosslinking the insulation composition of the insulation layer of the cable (A) in the presence of water, or
(ii) crosslinking at least one of the insulation composition of the insulation layer, the first semiconductive composition of the inner semiconductive layer or the second semiconductive composition of the outer semiconductive layer of the cable (B),
in the presence of water.

16. A crosslinked power cable obtainable by the process according to claim 15.

17. A master batch comprising
(i) a liquid or solid carrier polyolefin which is a polyethylene or polypropylene, wherein the amount of the carrier polyolefin is 30 wt % or more, based on the total amount of the master batch;

(ii) a silanol condensation catalyst compound of formula (I) or (II) in an amount of 0.7 to 15 wt % based on the total amount of the masterbatch, and
(iii) optionally a further component(s) selected from further polymer component(s), additive(s), filler(s) or colorant(s), or any mixtures thereof wherein formula (I) and (II) are $$MeR^1_n R^2_m Z_o \quad (I),$$

$$(Z_o R^2_m R^1_n Me)\text{-}R^3\text{-}(MeR^1_n R^2_m Z_o) \quad (II),$$

wherein in formula (I)
  Me is a transition metal of group 4 of Periodic Table of the Elements;
  n is an integer between 0 to 3;
  m is an integer between 0 to 4,
  o is an integer between 0 to 4, wherein n+m+o is 4, and at least m or o is other than 0;
  each $R^1$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s); and
  each $R^2$ independently is substituted or unsubstituted saturated or partially unsaturated hydrocarbyl group which optionally contains one or more heteroatom(s), or a substituted or unsubstituted aromatic hydrocarbyl group which optionally contains one or more heteroatom(s);
  or is a group hydrolysable to a Brönsted acid; provided that if o is 0, then at least one $R^2$ is a group hydrolysable to a Brönsted acid;
  or $R^1$ and $R^2$, or two $R^1$ groups or two $R^2$ groups form together with a ring system;
  each Z is independently a halogen atom;
  or wherein in formula (II),
    Me and $R^1$ have the meaning as defined in formula (I) above, and $R^2$ has the meaning as defined in formula (I) above, but without the above proviso;
    n is an integer between 0 to 3
    m is an integer between 0 to 3
    o is an integer between 0 to 3, wherein n+m+o is 3; and
    $R^3$ independently has the meaning as defined for $R^1$ in formula (I) above or $R^2$ in formula (I) above, but without the above proviso.

* * * * *